United States Patent
Kirk, II et al.

(10) Patent No.: US 8,859,100 B2
(45) Date of Patent: Oct. 14, 2014

(54) BARRIER STRUCTURE AND METHOD FOR MAKING

(75) Inventors: Peter A. Kirk, II, Manchester, NH (US); Ruth A. Jamke, Bedford, NH (US); Robert G. Pleydon, Worcester, MA (US); Jiri George Drobny, Merrimack, NH (US)

(73) Assignee: Saint-Gobain Performance Plastics Corporation, Aurora, OH (US)

( * ) Notice: Subject to any disclaimer, the term of this patent is extended or adjusted under 35 U.S.C. 154(b) by 706 days.

(21) Appl. No.: 12/363,490

(22) Filed: Jan. 30, 2009

(65) Prior Publication Data

US 2010/0119760 A1 May 13, 2010

Related U.S. Application Data

(60) Provisional application No. 61/113,844, filed on Nov. 12, 2008.

(51) Int. Cl.
| | | |
|---|---|---|
| *B29C 71/02* | (2006.01) | |
| *B29C 65/50* | (2006.01) | |
| *B32B 27/36* | (2006.01) | |
| *B32B 27/40* | (2006.01) | |
| *B32B 27/30* | (2006.01) | |
| *B32B 7/12* | (2006.01) | |
| *B32B 33/00* | (2006.01) | |
| *B32B 38/00* | (2006.01) | |
| *B29K 101/12* | (2006.01) | |
| *B32B 37/12* | (2006.01) | |
| *B29C 65/04* | (2006.01) | |
| *B29C 65/10* | (2006.01) | |
| *B29K 27/12* | (2006.01) | |
| *B29C 65/00* | (2006.01) | |
| *B29C 65/62* | (2006.01) | |
| *B29L 9/00* | (2006.01) | |
| *B29C 65/02* | (2006.01) | |

(52) U.S. Cl.
CPC ......... *B32B 33/00* (2013.01); *B29K 2995/0069* (2013.01); *B29C 65/5021* (2013.01); *B32B 2309/02* (2013.01); *B29C 65/50* (2013.01); *B32B 38/0008* (2013.01); *B32B 2307/3065* (2013.01); *B32B 2327/12* (2013.01); *B32B 2307/714* (2013.01); *B29K 2101/12* (2013.01); *B32B 37/12* (2013.01); *B32B 27/36* (2013.01); *B29C 65/04* (2013.01); *B29C 65/10* (2013.01); *B32B 2310/14* (2013.01); *B29K 2027/12* (2013.01); *B29C 66/91921* (2013.01); *B32B 27/40* (2013.01); *B32B 2309/105* (2013.01); *B29C 66/919* (2013.01); *B29C 65/62* (2013.01); *B32B 27/30* (2013.01); *B32B 7/12* (2013.01); *B29L 2009/00* (2013.01); *B29C 65/02* (2013.01)
USPC ............. 428/421; 428/58; 428/422; 428/500; 428/543; 428/704; 156/157; 156/272.6; 156/308.4; 156/309.9

(58) Field of Classification Search
USPC ................... 428/58, 421, 422, 500, 543, 704; 156/157, 272.6, 308.4, 309.9
See application file for complete search history.

(56) References Cited

U.S. PATENT DOCUMENTS 2,906,658 A   9/1959   Doban
3,030,290 A * 4/1962   Ryan, Jr. ....................... 204/169

(Continued)

FOREIGN PATENT DOCUMENTS

CN   1261306 A   7/2000
EP   0278685 A2  8/1988

(Continued)

OTHER PUBLICATIONS

Friedman, M. and Walsh, G., "High Performance Films: Review of New Materials and Trends", Polymer Engineering and Science 2002, 42(8), 1756-1788.*

(Continued)

*Primary Examiner* — Richard A Huhn
(74) *Attorney, Agent, or Firm* — Abel Law Group, LLP; Chi S. Kim

(57) ABSTRACT

The disclosure is directed to a barrier structure including a fluoropolymer layer and a polymeric layer. The barrier structure has a chemical permeation breakthrough detection time greater than about one hour for hazardous chemicals as measured by ASTM F739. The disclosure is further directed to a method of forming the aforementioned barrier structure. The barrier material is designed to be suitable for construction of shelters, clothing, containers and other articles requiring barrier properties.

24 Claims, 1 Drawing Sheet

(56) References Cited

U.S. PATENT DOCUMENTS

| | | | |
|---|---|---|---|
| 3,586,821 A | 6/1971 | Buob | |
| 3,676,181 A | 7/1972 | Kowalewski | |
| 4,317,860 A | 3/1982 | Strassel | |
| 4,317,861 A | 3/1982 | Kidoh et al. | |
| 4,444,861 A | 4/1984 | Nogami et al. | |
| 4,549,921 A | 10/1985 | Wolfe, Jr. | |
| 4,640,865 A | 2/1987 | Lancaster et al. | |
| 4,714,512 A | 12/1987 | House et al. | |
| 4,883,716 A | 11/1989 | Effenberger et al. | |
| 4,943,473 A | 7/1990 | Sahatjian et al. | |
| 4,946,736 A | 8/1990 | Sassa | |
| 5,075,065 A | 12/1991 | Effenberger et al. | |
| 5,112,692 A | 5/1992 | Strassel et al. | |
| 5,322,899 A | 6/1994 | Grunewalder et al. | |
| 5,427,831 A * | 6/1995 | Stevens | 428/36.2 |
| 5,529,830 A | 6/1996 | Dutta et al. | |
| 5,908,704 A | 6/1999 | Friedman et al. | |
| 6,183,861 B1 | 2/2001 | Carroll | |
| 6,306,503 B1 | 10/2001 | Tsai | |
| 6,726,976 B2 | 4/2004 | Dimitri | |
| 6,726,979 B2 * | 4/2004 | Friedman et al. | 428/141 |
| 6,759,129 B2 | 7/2004 | Fukushi | |
| 6,930,063 B2 | 8/2005 | Keese | |
| 7,141,303 B2 | 11/2006 | Clemens et al. | |
| 7,270,870 B2 | 9/2007 | Hetzler et al. | |
| 2002/0179240 A1 | 12/2002 | Clemens et al. | |
| 2003/0207118 A1 | 11/2003 | Fukushi et al. | |
| 2003/0232571 A1 | 12/2003 | Weinerth | |
| 2004/0144482 A1 | 7/2004 | Cherpinsky et al. | |
| 2004/0166270 A1 | 8/2004 | Yoshida et al. | |
| 2004/0229043 A1 | 11/2004 | Spohn et al. | |
| 2005/0077202 A1 | 4/2005 | Blum et al. | |
| 2005/0186372 A1 | 8/2005 | Shah et al. | |
| 2005/0255771 A1 | 11/2005 | Chetty et al. | |
| 2005/0271867 A1 | 12/2005 | Hetzler et al. | |
| 2007/0044906 A1 * | 3/2007 | Park | 156/272.2 |
| 2009/0197091 A1 | 8/2009 | Kirk, II et al. | |
| 2010/0266852 A1 | 10/2010 | Fan et al. | |

FOREIGN PATENT DOCUMENTS

| | | |
|---|---|---|
| EP | 0320258 A1 | 6/1989 |
| EP | 0976544 | 4/1998 |
| JP | 59-140052 A | 8/1984 |
| JP | 62-023751 A | 1/1987 |
| JP | 02-196643 A | 10/1989 |
| JP | H05-261856 A | 10/1993 |
| JP | 07001683 | 1/1995 |
| JP | 07228848 A | 8/1995 |
| JP | 07299890 | 11/1995 |
| JP | 08-181522 A | 7/1996 |
| JP | 09-508079 A | 8/1997 |
| JP | 09239923 | 9/1997 |
| JP | 2002202675 A | 7/2002 |
| JP | 2006-144875 A | 6/2006 |
| JP | 2007096575 A | 4/2007 |
| JP | 2007-145025 A | 6/2007 |
| JP | 2008-501552 A | 1/2008 |
| JP | 2011-510845 A | 4/2011 |
| KR | 20070011586 A | 1/2007 |
| WO | 92/08609 A2 | 5/1992 |
| WO | 9519883 A | 7/1995 |
| WO | 03037443 A1 | 8/2003 |
| WO | 2005002849 | 1/2005 |
| WO | 2008/005744 A2 | 1/2008 |
| WO | 2009099965 A | 8/2009 |
| WO | 2010056377 A | 5/2010 |

OTHER PUBLICATIONS

Initial IP Search, 3 pages, Nov. 21, 2007.
Technical Information Services Search Results, 25 pages, Apr. 20, 2009.
International Search Report from Related Case, PCT/US2009/032711, Sep. 9, 2009, 8 pages.
Related to U.S. Appl. No. 12/363,549, filed Jan. 30, 2009.
Bergna, et al.(eds.), "Colloidal Silica, Fundamentals and Applications," CRC Press, Boca Raton, FL, 2006, pp. 163-164.
"Standard Test Method for Permeation of Liquids and Gases through Protective Clothing Materials under Conditions of Continuous Contact", ASTM F739-07, Jan. 1, 2007, pp. 169-180, XP009165094.
"Shelter-Rite High Performance 8028 Architectural Fabric", Seaman Corporation, 2001, XP002688118, Retrieved from the Internet: URL:http://architecturalfabrics.com/downloads/product-data/8028_fabric_test_results.pdf [retrieved on Nov. 28, 2012].
Alphonsus V. Pocius, "Adhesion and Adhesives Technology: An Introduction". p. 153, Chemical Industry Press, Jan. 31, 2005. English Translation Attached.
International Search Report for PCT/US2009/0032669 dated Sep. 7, 2009, 4 pgs.

* cited by examiner

100

200

300

BARRIER STRUCTURE AND METHOD FOR MAKING

CROSS-REFERENCE TO RELATED APPLICATIONS

The present application claims priority from U.S. Provisional Patent Application No. 61/113,844, filed Nov. 12, 2008, entitled "BARRIER STRUCTURE AND METHOD FOR MAKING," naming inventors Peter A. Kirk, II., Ruth A. Jamke, Robert G. Pleydon, and Jiri George Drobny, which application is incorporated by reference herein in its entirety.

FIELD OF THE DISCLOSURE

This disclosure, in general, relates to barrier structures and methods for making such structures, as well as articles made from these barrier structures and methods for fabricating such articles.

BACKGROUND

Low surface energy polymers, such as fluoropolymers, exhibit good chemical barrier properties, exhibit a resistance to damage caused by exposure to chemicals, have a resistance to stains, demonstrate a resistance to damage caused by exposure to environmental conditions, and typically, form a release surface. While such low surface energy polymers are in demand, the polymers tend to be expensive. In addition, such polymers exhibit low wetting characteristics and given their tendency to form a release surface, adhere poorly with other polymer substrates.

For particular multilayer article applications, manufacturers have turned to high temperature processing and high temperature seaming. For instance, temperatures in excess of 350° F. are typically used. Unfortunately, these high temperatures often exceed the melting or even the degradation temperatures of many desirable substrates and coatings. Accordingly, fluoropolymers have typically been commercially adhered to high melt temperature substrates. These multilayer articles are typically expensive since they are limited to high melt temperature substrates. Commercially, there has been considerable difficulty with fluoropolymer adhesion to low melt temperature substrates, which are often more cost effective.

Hence, it would be desirable to provide both an improved multilayer article as well as a method for manufacturing such a multilayer article.

SUMMARY

In an embodiment, a barrier structure is provided. The barrier structure includes a fluoropolymer layer and a polymeric layer. The fluoropolymer layer has a major surface that is C-treated. The polymeric layer overlies the major surface of the fluoropolymer layer. The barrier structure has a chemical permeation breakthrough detection time greater than about one hour for hazardous chemicals, as measured by ASTM F739.

In another exemplary embodiment, a protective article is provided. The protective article includes a fluoropolymer layer having a major surface, wherein the major surface is C-treated. A polymeric layer overlies the major surface of the fluoropolymer layer. The protective article has a chemical permeation breakthrough detection time greater than about one hour for hazardous chemicals as measured by ASTM F739 and flame resistance wherein the protective article does not ignite during a three second flame exposure when tested in accordance with ASTM F1358.

In a further exemplary embodiment, a containment system is provided. The containment system includes a fluoropolymer layer having a major surface, wherein the major surface is C-treated, and a polyurethane layer overlying the major surface of the fluoropolymer layer.

A method of forming a barrier structure is provided. The method includes providing a fluoropolymer layer having a first major surface and a second major surface, wherein at least the first major surface of the fluoropolymer is C-treated. The method further includes providing a polymeric layer overlying the first major surface of the fluoropolymer layer.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1:
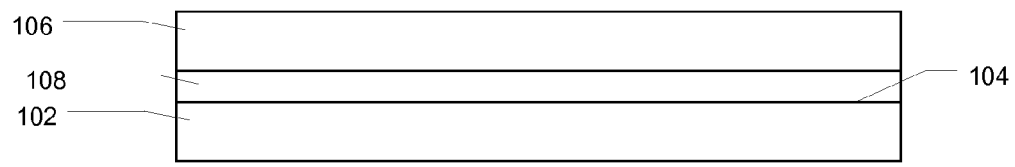
FIGS. 1, 2 and 3 include illustrations of exemplary barrier structures.

In a particular embodiment, a barrier structure includes a fluoropolymer layer having a major surface. The barrier structure further includes a polymeric layer overlying the major surface. In an embodiment, the fluoropolymer layer may be disposed directly on and directly contacts the first major surface of the polymeric layer without any intervening layer or layers.

An exemplary fluoropolymer used to form the fluoropolymer layer includes a homopolymer, copolymer, terpolymer, or polymer blend formed from a monomer, such as tetrafluoroethylene, hexafluoropropylene, chlorotrifluoroethylene, trifluoroethylene, vinylidene fluoride, vinyl fluoride, perfluoropropyl vinyl ether, perfluoromethyl vinyl ether, or any combination thereof. For example, the fluoropolymer is polytetrafluoroethylene (PTFE). Exemplary fluoropolymers films may be cast, skived, or extruded. In an embodiment, cast and extruded films may include layered structures such that the composition of the surfaces of the film may or may not match the interior, or each other.

Further exemplary fluoropolymers include a fluorinated ethylene propylene copolymer (FEP), a copolymer of tetrafluoroethylene and perfluoropropyl vinyl ether (PFA), a copolymer of tetrafluoroethylene and perfluoromethyl vinyl ether (MFA), a copolymer of ethylene and tetrafluoroethylene (ETFE), a copolymer of ethylene and chlorotrifluoroethylene (ECTFE), polychlorotrifluoroethylene (PCTFE), poly vinylidene fluoride (PVDF), a terpolymer including tetrafluoroethylene, hexafluoropropylene, and vinylidenefluoride (THV), or any blend or any alloy thereof. For example, the fluoropolymer may include FEP. In a further example, the fluoropolymer may include a copolymer of tetrafluoroethylene and perfluoropropyl vinyl ether (PFA). In an exemplary embodiment, the fluoropolymer may be a polymer crosslinkable through radiation, such as e-beam. An exemplary crosslinkable fluoropolymer may include ETFE, THV, PVDF, or any combination thereof. A THV resin is available from Dyneon 3M Corporation Minneapolis, Minn. An ECTFE polymer is available from Ausimont Corporation (Italy) under the trade name Halar. Other fluoropolymers may be obtained from Daikin (Japan) and DuPont (USA). In particular, FEP fluoropolymers are commercially available from Daikin, such as NP-12X.

In an embodiment, at least one surface of the fluoropolymer may include a C-treatable fluoropolymer. Exemplary C-treatable fluoropolymers include fluorinated ethylene propylene copolymer (FEP), a copolymer of ethylene and tetrafluoroethylene (ETFE), a copolymer of tetrafluoroethylene and perfluoropropyl vinyl ether (PFA), a copolymer of ethylene and chlorotrifluoroethylene (ECTFE), a copolymer of tetrafluoroethylene and perfluoromethyl vinyl ether (MFA), poly vinylidene fluoride (PVDF), and a terpolymer including tetrafluoroethylene, hexafluoropropylene, and vinylidenefluoride (THV). In an embodiment, the fluoropolymer has a first major surface and a second major surface where the first and second major surfaces include the same or different C-treatable fluoropolymers. An exemplary PTFE may be obtained from Saint Gobain, such as DF1700 DB.

In an embodiment, the fluoropolymer layer may be treated to improve adhesion of the fluoropolymer layer to the layer it directly contacts. In an embodiment, the treatment may include surface treatment, chemical treatment, sodium etching, use of a primer, or any combination thereof. In an embodiment, the treatment may include corona treatment, UV treatment, electron beam treatment, flame treatment, scuffing, sodium naphthalene surface treatment, or any combination thereof. In an embodiment, the treatment includes C-treatment. For C-treatment, the fluoropolymer layer is exposed to a corona discharge in an organic gas atmosphere, wherein the organic gas atmosphere comprises, for example, acetone or an alcohol. In an embodiment, the alcohol includes four carbon atoms or less. In an embodiment, the organic gas is acetone. In an embodiment, the organic gas is admixed with an inert gas such as nitrogen. The acetone/nitrogen atmosphere causes an increase of adhesion of the fluoropolymer layer to the layer that it directly contacts. In an embodiment, the treatment causes an increase of adhesion of the fluoropolymer layer to the polymeric layer. In an exemplary embodiment, the treatment includes C-treatment of a C-treatable fluoropolymer. An example of the C-treatment is disclosed in U.S. Pat. No. 6,726,979.

In another exemplary embodiment, at least one major surface of the fluoropolymer layer includes colloidal silica. The colloidal silica typically is present in a dispersion at an amount to provide adhesion between the fluoropolymer layer and the layer it directly contacts. In an embodiment, the colloidal silica is present in a dispersion that does not adversely impact the adhesive properties of the colloidal silica. An exemplary colloidal silica dispersion is described in U.S. Pat. No. 6,930,063, hereby incorporated by reference.

Typically, the fluoropolymer layer has a thickness of at least about 0.01 millimeters (mm). For example, the fluoropolymer layer may have a thickness of about 0.02 millimeters to about 0.3 millimeters. In an embodiment, the fluoropolymer layer may have a thickness of about 0.01 millimeters to 0.05 millimeters. In another embodiment, the fluoropolymer layer may have a thickness of about 0.1 millimeters to about 0.3 millimeters.

The polymeric layer overlies the fluoropolymer layer. In an embodiment, the polymeric layer directly contacts the fluoropolymer layer. The poylmeric layer includes polymeric materials such as thermoplastics and thermosets. An exemplary polymeric material may include polyamide, polyaramide, polyimide, polyolefin, polyvinylchloride (PVC), acrylic polymer, diene monomer polymer, polycarbonate (PC), polyetheretherketone (PEEK), fluoropolymer, polyester, polypropylene, polystyrene, polyurethane, thermoplastic blends, or any combination thereof. Further polymeric materials may include silicones, phenolics, nylon, epoxies or any combination thereof. In an embodiment, the polymeric layer includes polyvinylchloride. In an embodiment, the polymeric layer includes polyurethane. In an embodiment, the polymeric material has similar properties to PVC or polyurethane, including, for example, mechanical properties, flammability properties, bondable properties, and the like. Any polymeric layer suitable for contact with a contained fluid or other material is envisioned.

The polymeric layer may possess other properties specific to the intended use. For instance, the polymeric layer may contain polymeric fillers, mineral fillers, metallic fillers, or any combination thereof to change the appearance, abrasion resistance or other physical properties of the polymeric layer. In a particular embodiment, the polymeric layer may possess properties specifically intended for the embodiment when the polymeric layer(s) are the surface layer(s) of the barrier structure. For example, it may be colored in any desired color. It may be textured for appearance or for low surface friction. In an embodiment, the polymeric material may be stronger or more abrasion resistant than the fluoropolymer film underneath, thus maintaining barrier integrity in the face of physical stresses.

Typically, the polymeric layer has a thickness of at least about 0.1 millimeters. For example, the polymeric layer may have a thickness of about 0.2 millimeters to about 2.0 millimeters, such as about 0.2 millimeters to about 1.5 millimeters, such as about 0.2 millimeters to about 1.0 millimeters.

In an embodiment, a reinforcing layer may also be used. The reinforcing layer may be disposed in any position within the barrier structure to provide reinforcement to the structure. In an embodiment, the reinforcing layer may be disposed between the fluoropolymer layer and the polymeric layer. In another embodiment, the reinforcing layer may overlie the polymeric layer. In an embodiment, the reinforcing layer may be substantially embedded in the polymeric layer. "Substantially embedded" as used herein refers to a reinforcing layer wherein at least 25%, such as at least about 50%, or even 100% of the total surface area of the reinforcing layer is embedded in the polymeric layer. In an embodiment, at least about 25% of even about 50 % of even about 100% of the polymeric layer is directly in contact with the fluoropolymer layer. The reinforcing layer can be any material that increases the reinforcing properties of the barrier structure. For instance, the reinforcing layer may include natural fibers, synthetic fibers, or combination thereof. In an embodiment, the fibers may be in the form of a knit, laid scrim, braid, woven, or non-woven fabric. Exemplary reinforcement fibers include glass, aramids, polyamides, polyesters, and the like. In an embodiment, the reinforcing layer may be selected in part for its effect on the surface texture of the barrier structure formed. The reinforcing layer may have a thickness of less than about 5.0 mm, such as not greater than about 2.0 mm.

Optionally, the barrier structure further includes an adhesive layer disposed between the fluoropolymer layer and the polymeric layer. An exemplary adhesive layer improves the adhesion of the layers it directly contacts. In an embodiment, the adhesive layer is disposed between the fluoropolymer layer and the polymeric layer without any intervening layers. In an embodiment, the adhesive layer is disposed between the fluoropolymer layer and the reinforcing layer. In an embodiment, the reinforcing layer can be substantially embedded in the adhesive layer. In an embodiment, the adhesive layer is disposed between the reinforcing layer and the polymeric layer. In an embodiment, adhesive layers are disposed between the polymer layer and the reinforcing layer, and between the reinforcing layer and the fluoropolymer layer.

In an exemplary embodiment, the adhesive layer includes a thermoplastic material or a thermoset material. For instance, the thermoplastic material may include thermoplastic elastomers, such as cross-linkable elastomeric polymers of natural or synthetic origin. For example, an exemplary elastomeric material may include silicone, natural rubber, urethane, olefinic elastomer, diene elastomer, blend of olefinic and diene elastomer, fluoroelastomer, perfluoroelastomer, isocyanate, blends, or any combination thereof. In a particular embodiment, the adhesive layer includes polyurethane. Commercially available thermoplastic adhesive materials include polyurethanes 3206D and 3410 available from Bemis Associates. In a further embodiment, the adhesive layer includes a thermoplastic material having a melt temperature not greater than about 300° F. In an embodiment, the adhesive layer includes a thermoplastic material having a melt temperature not greater than about 350° F., such as not greater than about 400° F., such as not greater than about 450° F. In an embodiment, the adhesive layer includes a thermoplastic material having a melt temperature greater than about 500° F. Exemplary adhesive materials that adhere to C-treated fluoropolymer surfaces are described in U.S. Pat. No. 4,549,921, hereby incorporated by reference.

In another embodiment, the adhesive layer includes poly vinylidene fluoride-polyvinyl chloride (PVDF-PVC). In an embodiment, the PVDF and PVC of the adhesive layer are present at a ratio of greater than about 50/50 by weight, such as greater than about 60/40 by weight, such as about 75/25 to about 90/10 by weight, or even 75/25 to about 85/15 by weight.

Typically, the adhesive layer has a thickness of less than 0.3 mm, such as about 0.03 mm. For example, the thickness of the adhesive layer may be in a range of about 0.01 millimeters to about 0.1 millimeters.

An exemplary embodiment of a barrier structure 100 is illustrated in FIG. 1. The barrier structure includes fluoropolymer layer 102 having a major surface 104. A polymeric layer 106 overlies the major surface 104 of the fluoropolymer layer 102. In an embodiment, the barrier structure 100 may include a reinforcing layer 108 disposed between the fluoropolymer layer 102 and the polymeric layer 106. In an embodiment, the barrier structure 100 may include an adhesive layer (not shown) disposed between the fluoropolymer layer and the reinforcing layer.

Figure 2:
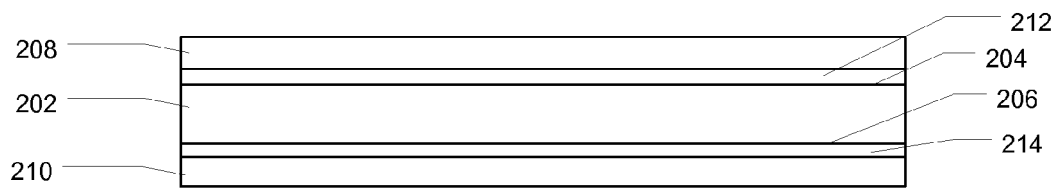

Another embodiment of a barrier structure 200 is illustrated in FIG. 2. The barrier structure includes a fluoropolymer layer 202 having a first major surface 204 and a second major surface 206. A first polymeric layer 208 overlies the first major surface 204 of the fluoropolymer layer 202. In an embodiment, a second polymeric layer 210 overlies the second major surface 206 of the fluoropolymer layer 202. The first polymeric layer 208 and the second polymeric layer 210 may be the same or different material. In an embodiment, the barrier structure 200 may include a first reinforcing layer 212 disposed between the fluoropolymer layer 202 and the first polymeric layer 208. In an embodiment, the barrier structure may further include a second reinforcing layer 214 disposed between the fluoropolymer layer 202 and the second polymeric layer 210. The first reinforcing layer 212 and the second reinforcing layer 214 may be the same or different material. In an embodiment, the barrier structure 200 may include an adhesive layer (not shown) disposed between the fluoropolymer layer and the first reinforcing layer 212 and/or the second reinforcing layer 214. The first adhesive layer and the second adhesive layer may be the same or different material. Any number of layers may be envisioned.

Figure 3:
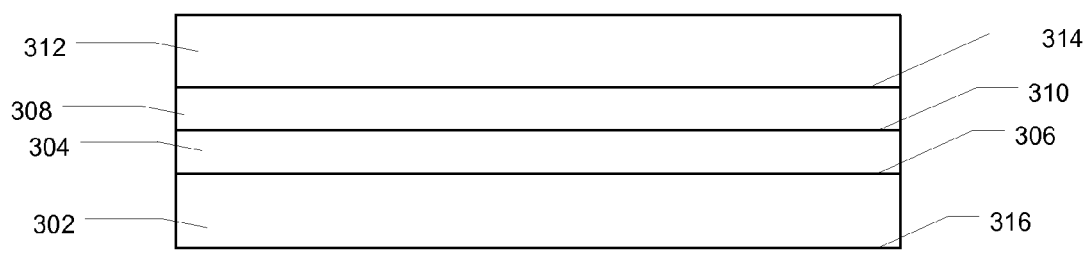

Another exemplary barrier structure is illustrated in FIG. 3 and is generally designated 300. The barrier structure includes fluoropolymer layer 302 and the adhesive layer 304 overlying a major surface 306 of the fluoropolymer layer 302. In an embodiment, the fluoropolymer layer 302 directly contacts the adhesive layer 304. As seen in FIG. 3, a reinforcing layer 308 directly contacts a major surface 310 of the adhesive layer 304. A polymeric layer 312 directly contacts a major surface 314 of the reinforcing layer 308. In a further embodiment, a second adhesive layer (not shown) may contact a second major surface 316 of the fluoropolymer layer 302. The first adhesive layer and the second adhesive layer may be the same or different material. In a further embodiment, the barrier structure may include a second polymeric layer (not shown) in contact with the second adhesive layer. The first polymeric layer and the second polymeric layer may be the same or different material. In another further embodiment, a second reinforcing layer (not shown) may be sandwiched between the second adhesive layer and the second polymeric layer. The first reinforcing layer and the second reinforcing layer may be the same or different material. In an embodiment, any number of layers may be envisioned.

In an embodiment, the barrier structure may be formed through a method that includes providing a fluoropolymer layer. Typically, the fluoropolymer layer may be extruded, cast, or skived. Further, the fluoropolymer layer that is provided has a surface that may be C-treated. In an embodiment, the method further includes C-treating the surface of the fluoropolymer layer. As stated earlier, C-treatment includes exposing at least one surface of the fluoropolymer layer to a corona discharge in an organic gas atmosphere. In an embodiment, the organic gas atmosphere includes acteone or an alcohol. In an embodiment, the organic gas is acetone. Typically, the organic gas is admixed with an inert gas such as nitrogen. The method further includes providing the polymeric layer. In an embodiment, the polymeric layer overlies and directly contacts the fluoropolymer layer without any intervening layer or layers. The polymeric layer may be processed. Processing of the polymeric layer, particularly thermoplastics, may include casting, extruding or skiving. In an embodiment, the polymeric layer may be embossed, textured, or otherwise surface treated in order to create desirable surface properties, such as a low friction surface. The reinforcement layer, if present, may be selected in part for its effect on the surface texture, which may also reduce the effective surface friction, for example. In an embodiment, the layers are typically heated to a temperature not greater than about 350° F. to form the barrier structure. In an embodiment, the layers are typically heated to a temperature not greater than about 300° F. to form the barrier structure.

In an embodiment, the barrier structure may include a reinforcing layer. The method of disposing the reinforcing layer between the fluoropolymer layer and the polymeric layer is dependent upon the material of the reinforcing layer as well as the layers it directly contacts. Any suitable method may be envisioned. For instance, a commercially available material may be laid between the fluoropolymer layer and the polymeric layer prior to providing the polymeric layer. In an embodiment, a reinforcing layer may be provided within the polymeric layer, for instance a commercially available material may include a reinforcing layer substantially embedded within the polymeric layer. Subsequent heating of the barrier structure may adhere the layers.

In an embodiment, the barrier structure may include an adhesive layer. For instance, the adhesive layer may be applied to the fluoropolymer layer and subsequently applied to the polymeric layer. For instance, the adhesive may be applied to both the polymeric layer and the reinforcement layer, which are subsequently applied to the fluoropolymer layer. For instance, the adhesive layer may be extruded, melted, or laminated directly onto the fluoropolymer layer.

For instance, the adhesive layer may be melted to a temperature to melt the adhesive layer, direct-extruded, or belt-laminated in any number of steps. In another embodiment, the adhesive layer may be applied to the polymeric layer and subsequently applied to the fluoropolymer layer. In an embodiment, the barrier structure may be formed through a method wherein the adhesive layer is extruded between the polymeric layer and the fluoropolymer layer.

In an embodiment, the adhesive layer may be applied to the fluoropolymer layer in a liquid state and dried or cured. In an embodiment, the adhesive layer may be in a liquid molten state and then cooled and solidified. Drying or curing may occur at a sufficient temperature to adhere the adhesive layer to the fluoropolymer layer. For instance, the adhesive layer may be a polymer material suspended in an aqueous solution. In another embodiment, the adhesive layer may be colloidal silica suspended in an aqueous solution. The adhesive layer and fluoropolymer layer may then be adhered to the polymeric layer. In another embodiment, the adhesive layer may be applied to the polymeric layer in a liquid state and dried or cured. The adhesive and polymeric layer may then be adhered to the fluoropolymer layer.

The application of the adhesive layer is typically dependent upon the material used. For instance, a thermoplastic adhesive may be applied in one step, and the polymeric layer applied much later, or the assembly may be done in one pass. Where the adhesive layer is a thermoset material, the assembly is typically done in one process, with the liquid adhesive applied to one or more of the layers which are then brought together; heat may or may not be used to cure the thermosetting adhesive.

Once the barrier structure is formed, the structure may be subjected to a seaming process. In an embodiment, two or more barrier structures may be seamed. For instance, overlapping marginal end regions of two structures and applying a seaming process typically produces a seam. Any seaming process that provides a seam between polymeric materials is envisioned. A typical seaming process includes thermal treatment. In an embodiment, the thermal seaming process occurs at a temperature such that the barrier structure does not degrade. In an embodiment, the thermal seaming process typically occurs at a temperature not greater than about 300° F. In an embodiment, the seaming process occurs at a temperature not greater than about 250° F. In an embodiment, the thermal treatment is at a temperature from about 250° F. to about 350° F. In an embodiment, the thermal treatment is at a temperature not greater than about 350° F. In an embodiment, the thermal treatment is at a temperature greater than about 180° F. In an embodiment, the thermal treatment is at a temperature not greater than about 380° F., such as at a temperature of about 180° F. to about 380° F. Further exemplary seaming construction methods include lap seaming or butt seaming using hot air seaming, high frequency seaming, RF welding, sewing, hot platen seaming, or adhesive tape seaming processes. In an embodiment, the barrier structure is thermobondable. In an exemplary embodiment, two or more barrier structures may be thermally bonded or welded. In an embodiment, the barrier structures are typically thermally bonded at a temperature not greater than the melt temperature of the fluoropolymer layer. For instance, the barrier structure is thermobondable at temperatures not greater than about 350° F., such as at temperatures not greater than about 300° F. In an exemplary embodiment, a thermoplastic polymer is disposed on both surface of the fluoropolymer layer and the barrier structure may be bonded to itself by thermal (contact, hot air, etc.) or RF welding methods, in order to fabricate articles.

Once formed, particular embodiments of the above-disclosed barrier structure advantageously exhibit desired properties such as improved chemical barrier properties and flammability resistance. In an embodiment, the barrier structure may have a chemical permeation breakthrough time of greater than about one hour for hazardous chemicals, as measured in accordance with ASTM F739. In an embodiment, the barrier structure may have a chemical permeation breakthrough time of greater than about three hours for hazardous chemicals, as measured in accordance with ASTM F739. In a further embodiment, the barrier structure meets the chemical permeation standards set by NFPA 1991 as measured in accordance with ASTM F 739. For example, the barrier structure meets the chemical permeation standards set by NFPA 1991 in Section 7.2.1 as measured in accordance with ASTM F 739 for hazardous chemicals such as acetone, acetonitrile, ammonia gas, 1,3-butadiene, carbon disulfide, chlorine gas, dichloromethane, diethylamine, dimethyl formamide, ethyl acetate, ethylene oxide, hexene, hydrogen chloride gas, methanol, methyl chloride gas, nitrobenzene, sodium hydroxide, sulfuric acid, tetrachloroethylene, tetrahydrofuran, and toluene. Chemical breakthrough time is defined as being the point at which the permeation rate reaches or exceeds 0.1 $\mu g/cm^2/min$.

In an embodiment, the barrier structures have a flammability resistance such that they do not ignite in the 3 second flame exposure component of ASTM F1358. In a further embodiment, the barrier structure meets the flammability resistance standards set by NFPA 1991. For example, the barrier structure meets the flammability resistance standards set by NFPA 1991 in Section 7.2.2 as measured in accordance with ASTM F1358 wherein suit materials shall not ignite during the initial 3-second exposure period, shall not burn a distance of greater than 100 mm (4 in.), shall not sustain burning for more than 10 seconds, and shall not melt as evidenced by flowing or dripping during the subsequent 12-second exposure period, i.e. no melt.

In an exemplary embodiment, the barrier structure may exhibit desirable burst strength and puncture propagation tear resistance. For instance, the barrier structure may have a burst strength of at least about 200N, when tested in accordance with the ring clamp method in ASTM D751. In particular, the burst strength may be greater than about 200N, such as greater than about 300N, such as greater than about 500N, or even greater than about 600N. In an embodiment, the barrier structure may have a puncture propagation tear resistance of greater than about 49N, when tested in accordance with ASTM D2582. In particular, the puncture propagation tear resistance may be greater than about 60N, such as greater than about 100N, or even greater than about 150 N, as measured in accordance with ASTM D2582.

In an embodiment, the barrier structure may exhibit a desirable seam strength when seamed. For instance, the barrier structure may have a seam strength of greater than about 15 lb/in, such as greater than about 25 lb/in, or even greater than about 40 lb/in, when tested in accordance with ASTM D751.

In an embodiment, the barrier structure may exhibit a desirable cold bending moment. In particular, the cold bending moment may be not greater than about 0.050 Nm, such as not greater than about 0.025 Nm, or even not greater than about 0.010 Nm at −25° C., when tested in accordance with ASTM D747.

In an embodiment, the barrier structure may exhibit a desirable tensile strength. For instance, the barrier structure may have a tensile strength of at least about 1.5 kN/m, such as at least about 3.0 kN/m, when tested in accordance with ASTM D751. In an exemplary embodiment, the barrier structure has both a chemical permeation resistance of greater than about one hour for hazardous chemicals, when measured by ASTM F739, and a burst strength of at least about 200N, when measured by ASTM D751. In an exemplary embodiment, the barrier structure has both a chemical permeation resistance of greater than about one hour for hazardous chemicals, when measured in accordance with ASTM F739, and a tensile strength of at least about 3.0 kN/m, when measured in accordance with ASTM D751.

Barrier structures made of the layers described above may have numerous applications. In an embodiment, the barrier structure may be faced with thermoplastic polymers. As stated earlier, seams can be readily made with the barrier structures, making it suitable for fabrication into various articles that generally take advantage of their barrier properties. Manufacturing and materials selection flexibility imparted by relatively low temperature seaming methods, coupled with the chemical barrier properties of fluoropolymer films, is a novel contribution to many potential markets.

Applications include, for example, uses when the properties such as the above-mentioned burst strength, tensile strength, tear resistance, chemical permeation, and/or flammability resistance are desired. For instance, the barrier structure may be used when a chemical and/or biological resistant material is desired. In an embodiment, exemplary barrier structures include shelters, liners, protective gear, clothing, and fluid containment systems. The structure may also possess other properties desired for any particular application envisioned.

In an embodiment, protective articles are made from the barrier structures, such as suits and soft shelters. The protective articles make use of particular embodiments' low permeability to hazardous chemicals. In an exemplary embodiment, the protective article has both a chemical permeation resistance of greater than about one hour for hazardous chemicals, when measured by ASTM F739, and a flame resistance of non-ignition in the 3 second flame exposure, when measured by ASTM F1358. Other properties such as flame resistance and mechanical properties are typically desired, as set out in specifications and industry standards such as NFPA 1991.

Containment articles, such as portable personal hydration systems, may be fabricated in whole or in part from these barrier structures. Such articles take advantage of the chemical barrier properties to protect the fluid within, while the surface polymeric layers may be selected as needed for appearance or performance, with the proviso that the interior facing polymeric layer must be suitable for contact with drinking water.

Other containment articles can be envisioned, wherever chemical or biological barrier properties are required, such as for transportation of potentially hazardous chemical or biological materials.

EXAMPLE 1

An exemplary barrier structure is made. The fluoropolymer layer is about 1.0 mil film obtained from Saint Gobain, similar to product DF1700 DB. The fluoropolymer layer is C-treated on both sides. An adhesive layer of an isocyanate adhesive film having about 1.0 mil thickness is on both the first major surface and the second major surface of the fluoropolymer. A reinforcement layer of flame retardant weft-inserted warp knit polyester (about 3.0 mil thick) is placed on an adhesive layer. A polymeric layer of store-bought PVC is on the reinforcement layer and the adhesive layer.

The barrier structure is tested for some of the key mechanical properties required by NFPA 1991—chemical permeability, burst strength, puncture propagation, seam strength, and flame resistance—and passed easily. Results can be seen in Table 1.

TABLE 1

| Test | NPFA 1991 spec | Result |
| --- | --- | --- |
| Chemical permeability | >1 hour | >3 hours |
| Burst strength | 200N | 702N |
| Puncture propagation | 49N | 150N |
| Seam Strength | 15 lb/inch | 42 lb/inch |
| Flame resistance | No ignition | No melt |

The properties of fluoropolymers and selection of polymeric materials for the polymer layer enable the structure to pass the flammability requirement as set in NPFA 1991. Further, the properties of fluoropolymers enable the structure to pass the chemical permeation requirement as set in NFPA 1991.

EXAMPLE 2

An exemplary barrier structure is made. The fluoropolymer layer is a 1.0 (nominal) mil (0.0010") film obtained from Saint Gobain, product DF1700 DB. The fluoropolymer layer is C-treated. The adhesive layer is a polyurethane melt adhesive film having 2 mil thickness (Bemis 3206). The polymeric layer is store-bought PVC having a clear, shiny finish.

This combination is combined in a press for 60 seconds at about 50 psi. To obtain lasting bond strength between the fluoropolymer and the adhesive in excess of the fluoropolymer film yield strength, the adhesive layer can be heated to a temperature of about 300° F. for FEP and about 350° F. for the PFA side. (The fluoropolymer film yield strength is about 2.0 lb/inch such that in peeling, the fluoropolymer is irreversibly stretched to a large degree or torn.) Good bonding to the PVC is observed from 250° F. The lamination can be accomplished in one step since the PVC does not appear to melt under these conditions.

EXAMPLE 3

A barrier structure is made using the conditions from Example 2 with the following variations. "ST-3477 polyurethane" is the polymeric layer (obtained from Stevens Urethane), the Bemis 3206 adhesive is first bonded to the DF1700 DB as above, and then the polyurethane polymeric layer is laminated to the adhesive in a separate step at a lower temperature and pressure (25 psi). Heating at a temperature of 300° F. and some melting of the polyurethane results in a good bond.

EXAMPLE 4

Specimens of the following materials are made for full mechanical testing. The fluoropolymer layer is 1.0 mil of C-treated DF1700 DB. The adhesive layer is polyurethane Bemis 3206 at a thickness of 2.0 mils. For one barrier structure, the substrate layer is polyvinylchloride (PVC) from Plastic Film Corporation, weight 12, hardness "3H" having a matte finish. For the second barrier structure, the polymeric layer is polyvinylchloride (PVC) from Plastic Film Corporation, weight 12, hardness "2S" having a matte finish. The two structures are made on a belt. Conditions are at a temperature of 350° F.; speed: 3 ft/min (over three 1' long heated platens); a light nip pressure is applied downstream of the platens:.

The two barrier structures are tested for some of the key mechanical properties required by NFPA 1991—burst, tear propagation, cold bending moment—and passed easily. Results can be seen in Table 2.

TABLE 2

|  | Burst strength (N) ASTM D751 - ring clamp method | Tear resistance (N) ASTM D2582 | Cold bending moment (ft-lb) ASTM D747 at −25° C. |
| --- | --- | --- | --- |
| NPFA 1991 spec | 200N minimum | 49N minimum | 0.057 maximum |
| 2S laminate | 532 | n/a | n/a |
| 3H laminate | 677 | 111 | 0.045 |

The properties of fluoropolymers and selection of polymeric materials for the polymer layer enable the structures to pass the flammability requirement as set in NPFA 1991. Further, the properties of fluoropolymers enable the structures to pass the chemical permeation requirement as set in NFPA 1991.

EXAMPLE 5

Two exemplary structures are made. The fluoropolymer layer is PVDF with a 80/20 by weight ratio of PVDF/PVC as the adhesive layer. The polymeric layer is PVC with a subsequent layer of PVC fabric coated with polyester (Seaman 8028). The PVC used in the adhesive layer and as the polymeric layer is Geon® 552 for the first barrier structure and Geon® 576 for the second barrier structure. The film of PVDF is cast on a 2 mil thick Melinex S carrier (size 2×4 inches). Two coats of PVDF compounded latex are applied, dried 2 minutes at 250° F. and fused 30 seconds at 400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 300° F. (1 minutes, 40 psig). The first barrier structure results in a good bond. The second barrier structure has an excellent bond to the PVC coated fabric however, the PVC polymeric layer is cracked.

EXAMPLE 6

Multiple barrier structures are prepared with different PVDF/PVC ratios and diluted polymeric layer. The fluoropolymer layer is PVDF, the adhesive layer is PVDF/PVC, and the polymeric layer is PVC from Geon® 576. The PVDF/PVC ratios are 80/20, 85/15, and 90/10. The film of PVDF is cast on a 2 mil thick Melinex S carrier (size 2×4 inches) by free dipping two layers, drying 2 minutes at 250° F. and fused 30 seconds at 390°-400° F. The PVDF/PVC tie layer is applied to the PVDF layer, dried, and fused as above. The PVC layer is applied by a free dip and dried for 2 minutes at 250° F. This layer is fused during the drying step. This film is bonded to the PVC coated fabric in a foot press at 350° F. (1 minutes, 40 psig) and placed between two 5-mil thick Kapton HN films. In all cases, the bond of the film exceeds its tensile strength.

EXAMPLE 7

A barrier structure from a fluoropolymer layer of PVDF, 80/20 by weight ratio PVDF/PVC adhesive layer, and PVC polymeric layer is produced on a pilot tower. The carrier used is 5 mil Kapton HN, 10 in. wide. The running conditions are: drying zone set point of 250° F.; fusing zone set point of 400° F.; web speed of 7 fpm; bars are size 28 (grooved). The barrier structure is then bonded to PVC coated with polyester (Seaman 8028). In this case, the bond of the film to the coated PVC fabric exceeds the film strength.

EXAMPLE 8

A barrier structure using a C-treatment on the fluoropolymer is obtained from Saint Gobain, product DF1100. The barrier structure shows good adhesion to materials such as polyurethane (Bemis 6329) and liquid silicone rubber.

EXAMPLE 9

The fluoropolymer layer is a 1.0 (nominal) mil film, DF1700 DB available from Saint-Gobain. The fluoropolymer layer is C-treated on one or both sides. An adhesive layer of Adcote 331 (available from Rohm and Haas) is coated onto the C-treated layer(s) at a wet thickness of 3 mil and dried at 100° C. for 5 minutes. A polymeric layer of ST-3447 thermoplastics polyurethane (available from Stevens Urethane) is calendered onto the adhesive layer. After curing the adhesive layer at 120° F. for 24 hours then aging for one week, the peel strength of the polyurethane from the C-treated fluoropolymer surface is over 2 lb/inch.

EXAMPLE 10

The fluoropolymer layer is a 1.0 (nominal) mil film, DF1700 DB available from Saint-Gobain. The fluoropolymer layer is C-treated on one or both sides. An adhesive layer of Adcote 331 (available from Rohm and Haas) is coated onto the C-treated layer(s). The adhesive dried at 100° C. for 5 minutes, then cured at 120° F. for 24 hours leaving a non-tacky surface. One week later a polymeric layer of ST-3447 thermoplastics polyurethane (available from Stevens Urethane) is laminated to the cured, adhesive-coated surface in a press (320° F., 1 minute, 50 psi). The peel strength, measured the next day, was 2.16 lb/inch.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:
1. A barrier structure comprising:
   a fluoropolymer layer consisting essentially of a fluoropolymer, the fluoropolymer layer having a major surface, wherein the major surface is C-treated by exposing the major surface to a corona discharge in an organic atmosphere; and
   a polymeric layer overlying the major surface of the fluoropolymer layer;
   wherein the barrier structure is thermally seamable at a temperature not greater than about 300 ° F.;
   wherein the barrier structure has a chemical permeation breakthrough detection time greater than about one hour for hazardous chemicals as measured by ASTM F739.
2. The barrier structure of claim 1, wherein the major surface is a C-treatable fluoropolymer including fluorinated ethylene propylene (FEP), perfluoroalkoxy-modified PTFE, a copolymer of tetrafluoroethylene and perfluoropropyl vinyl ether (PFA), or blends thereof.

3. The barrier structure of claim 1, wherein the polymeric layer is a thermoset material or a thermoplastic material.

4. The barrier structure of claim 1, wherein the polymeric material includes polyvinyl chloride (PVC).

5. The barrier structure of claim 1, wherein the polymeric material includes polyurethane.

6. The barrier structure of claim 1, further comprising a reinforcing layer disposed between the fluoropolymer layer and the polymeric layer.

7. The barrier structure of claim 1, further comprising an adhesive layer disposed between the fluoropolymer layer and the polymeric layer.

8. The barrier structure of claim 1, wherein the fluoropolymer layer directly contacts the major surface of the polymeric layer.

9. The barrier structure of claim 1, having a burst strength of greater than about 200 N as measured in accordance with ASTM D751.

10. The barrier structure of claim 1, having a chemical permeation breakthrough detection that meets NFPA 1991 standards for hazardous chemicals as measured in accordance with ASTM F739.

11. The barrier structure of claim 1, having a flame resistance of non-ignition in a 3 second flame exposure, when measured by ASTM F1358.

12. The barrier structure of claim 1, having a puncture propagation of greater than about 49 N as measured in accordance with ASTM D2582.

13. The barrier structure of claim 1, having a cold bending moment of not greater than about 0.050 Nm at $-25$ ° C. as measured in accordance with ASTM D747.

14. The barrier structure of claim 1, wherein the barrier structure is seamed by a thermal process at a temperature not greater than about 300 ° F. such that the barrier structure does not degrade.

15. The barrier structure of claim 14, having a seam strength of greater than about 15 lb./inch as measured by ASTM D751.

16. The barrier structure of claim 1, wherein the barrier structure is thermobondable.

17. The barrier structure of claim 1, wherein the barrier structure is a protective clothing, a protective shelter, or a containment system.

18. A protective article comprising:
a layer consisting essentially of a fluoropolymer, the fluoropolymer layer having a major surface, wherein the major surface is C-treated by exposing the major surface to a corona discharge in an organic atmosphere; and
a polymeric layer overlying the major surface of the fluoropolymer layer;
wherein the barrier structure is thermally seamable at a temperature not greater than about 300 ° F.;
wherein the protective article has a chemical permeation breakthrough detection time greater than about one hour for hazardous chemicals as measured by ASTM F739 and a flame resistance of non-ignition in a 3 second flame exposure, when measured by ASTM F1358.

19. A containment system comprising:
a fluoropolymer layer consisting essentially of a fluoropolymer, the fluoropolymer layer having a major surface, wherein the major surface is C-treated by exposing the major surface to a corona discharge in an organic atmosphere; and
a polyurethane layer overlying the major surface of the fluoropolymer layer;
wherein the barrier structure is thermally seamable at a temperature not greater than about 300 ° F.;
wherein the barrier structure has a chemical permeation breakthrough detection time greater than about one hour for hazardous chemicals as measured by ASTM F739.

20. A method of forming a barrier structure comprising:
providing a fluoropolymer layer fluoropolymer layer consisting essentially of a fluoropolymer, the fluoropolymer layer having a first major surface and a second major surface, wherein at least the first major surface of the fluoropolymer is C-treated by exposing the first major surface to a corona discharge in an organic atmosphere; and
providing a polymeric layer overlying the first major surface of the fluoropolymer layer;
wherein the barrier structure is thermally seamable at a temperature not greater than about 300 ° F.;
wherein the barrier structure has a chemical permeation breakthrough detection time greater than about one hour for hazardous chemicals as measured by ASTM F739.

21. The method of claim 20, further comprising heating the barrier structure to a temperature not greater than about 350 ° F.

22. The method of claim 20, further comprising providing a reinforcement layer disposed between the fluoropolymer layer and the polymeric layer.

23. The method of claim 20, further comprising providing an adhesive layer prior to providing the polymeric layer.

24. The method of claim 20, further including the step of seaming the article via thermal treatment at a temperature not greater than about 300 ° F.

* * * * *